June 3, 1952 V. J. KNUDSEN 2,598,921
PIPE HANDLING SLING
Filed May 15, 1950
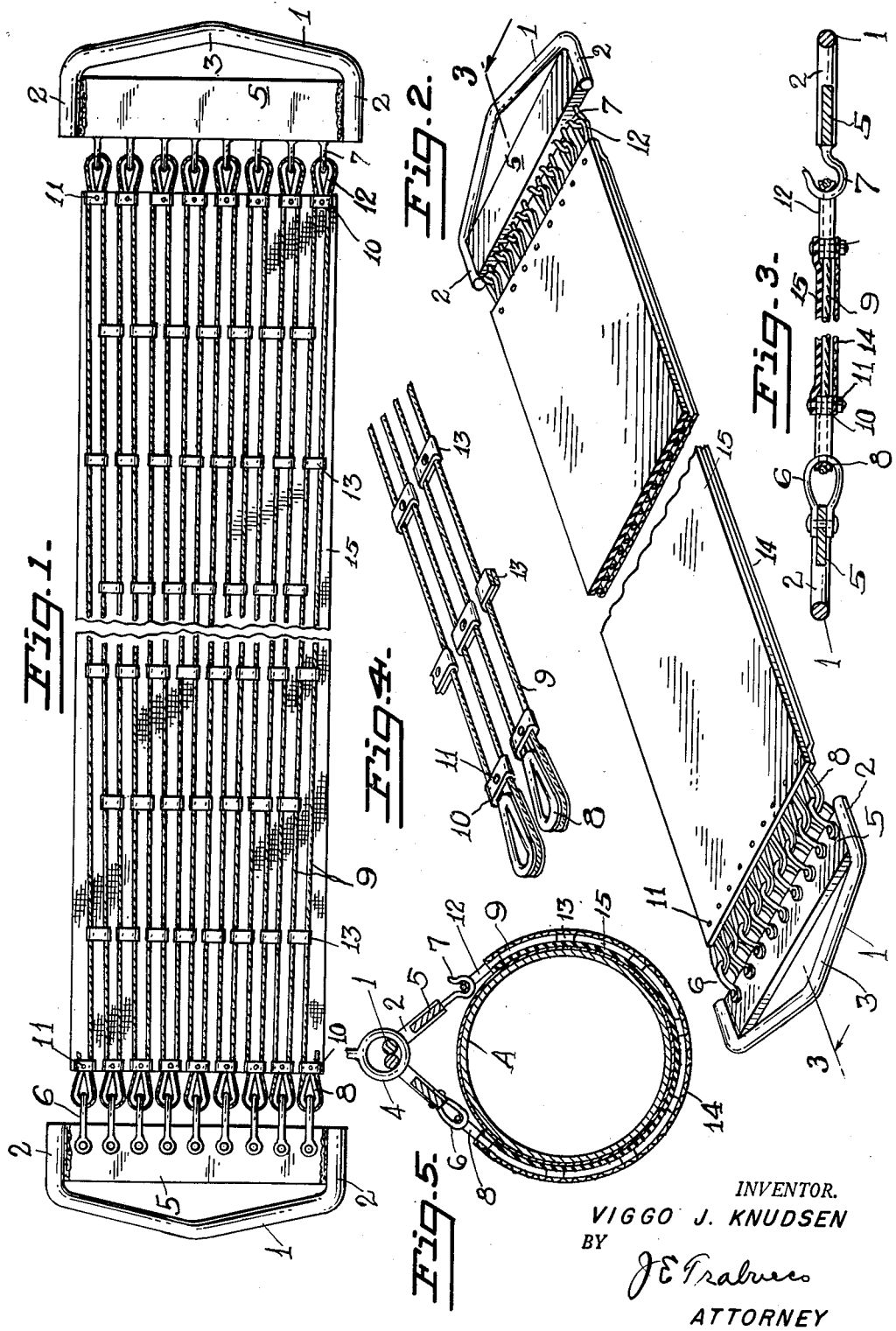
INVENTOR.
VIGGO J. KNUDSEN
BY
*J E Seabrees*
ATTORNEY Patented June 3, 1952

2,598,921

UNITED STATES PATENT OFFICE 2,598,921

PIPE HANDLING SLING

Viggo J. Knudsen, San Mateo, Calif.

Application May 15, 1950, Serial No. 161,925

5 Claims. (Cl. 294—74)

The present invention relates to an improved sling of the type adapted for use in handling pipe or the like.

When handling sections of large paper and tar coated pipe of the type used in conveying natural gas or the like, it is desirable that equipment be used which is not apt to tear or otherwise damage the outer pipe covering. It is equally as desirable to employ equipment which is not apt to break or otherwise release the load while the pipe is being transferred into a receiving ditch or the like.

The present invention provides a novel sling which adequately satisfies these and other important requirements. The pipe handling sling embodying my invention is both strong and durable. It is so constructed that damage will not result to the outer paper covering on the pipe while the latter is being supported in the sling and transferred from one position to another. The ends of the sling are provided with means which normally prevents the release of the load when in operation, the said means permitting the convenient detachment of the sling after the load has once been transferred to a desired position.

The primary object of my invention is to provide a novel sling of the kind characterized, embodying a durable and strong construction which is provided with protective means which normally prevents damage to its load.

Other and further objects of my invention will be pointed out hereinafter, or will be indicated in the appended claims, or will be obvious to one skilled in the art upon an understanding of the present disclosure. For the purpose of this application I have elected to show herein certain forms and details of a pipe sling representative of my invention; it is to be understood, however, that the embodiment of my invention herein shown and described is for the purpose of illustration only, and that therefore it is not to be regarded as exhaustive of the variations of the invention.

In the accompanying drawings:

Fig. 1 is a bottom view of a part of a sling embodying my invention, showing the bottom canvas member removed and for illustration purposes also showing one of the two V-shaped end members detached from the duplex ring which is normally connected to both end members;

Fig. 2 is a perspective view of the complete sling showing also the duplex ring detached from one of the V-shaped end members;

Fig. 3 is a sectional view taken on the line 3—3 of Fig. 2;

Fig. 4 is a detail view showing a fragmentary part of the sling, particularly the manner in which the cables or strands are connected to one another along the length of the sling; and Fig. 5 is a sectional view showing the sling in an operative position supporting a pipe.

Referring to the drawings, the numerals 1, 1 designate rigid end members of substantially V-shape, each having parallel legs 2, 2 and a connecting portion which is preferably bent outwardly as at 3. The end members 1, 1 are preferably permanently secured to one end of a duplex ring 4 or the like which in practice is connected by suitable means to a crane or the like which is used in lifting the load and transferring it from one point to another. Secured as by welding, or other suitable means, to the legs 2, 2 of the end members 1, 1 are rigid plates 5, one of which has a plurality of equally spaced rings 6 secured thereto as by rivets and the other of which has the same number of similarly spaced hooks 7 attached to it as by welding or other suitable means.

Secured to the rings 6 are a plurality of grooved thimbles 8, each of which has an end of a length of cable or wire rope 9 secured thereto. The engaging end of a cable 9 extends around its associated grooved thimble 8 and is secured against detachment by a flattened metal ring 10 having a rivet or bolt 11 extending therethrough. There are a considerable number of cables 9, and each is similarly secured at its opposite end to a similar thimble 12 by the same type of metal ring 10 and rivet 11. In the particular example shown herein, there are sixteen separate cables 9 and alternately securing them one to another along their lengths are a plurality of flattened metal rings 13. By having the cables 9 alternately secured together along their lengths at spaced intervals by the flattened rings 13, a strong flexible structure is provided which is adapted to support a considerable weight. The thimbles 12 are adapted to detachably engage with the hooks 7 when the sling is arranged in a supporting position with respect to a load, such as a paper and tar coated pipe A, as shown in Fig. 5.

Secured at its ends to the flattened end rings 10 as by the rivets 11 is a length of canvas 14 or other suitable material which is arranged beneath the cables 9 and is adapted to prevent the cables and the flattened rings 13 from collecting dirt or foreign material when the sling is brought into engagement with the ground. If so desired the canvas 14 may be attached at different points along its length to the flattened rings 13 by suitable means such as rivets.

Secured to the flattened end rings 10 as by the same rivets 11 is a length of flexible rubber or other suitable material which is arranged at the upper side of the sling, thereby forming a protective member 15 which prevents the cables 9 and the flattened rings 13 from contacting the outer coating of paper on the pipe A. The protective member 15, being arranged to contact the outer covering of the pipe when the sling is in use, normally avoids damage thereto.

In operation, the sling is first extended beneath the pipe with the protective member 15 engaging therewith. The thimbles 12 are then fastened to the hooks 7, and after such connections are made the necessary upward supporting pull is exerted on the duplex ring 4 to lift the pipe and transfer it from one location to another. The sling may be detached from the pipe by unhooking the thimbles 12 from the hooks 7.

It is to be understood that the term "cable" as used herein is to be construed broadly to include chains, ropes, strands, wires, and any other length of material capable of supporting a considerable weight.

What I claim is:

1. In a supporting sling, a pair of substantially V-shaped rigid end members adapted to be attached to a common connection, the said end members having opposed legs, a rigid plate interposed between and secured to the opposed legs of each end member, a plurality of laterally spaced hooks secured to one of the plates, a plurality of substantially parallel lengths of cable connected permanently at adjacent ends to one of the plates and having means at their opposite ends for detachably connecting them to the hooks on the other plate.

2. In a supporting sling, a pair of substantially V-shaped rigid end members adapted to be attached to a common connection, the said end members each having opposed legs, a rigid member extending between and secured to the legs of each end member, a plurality of laterally spaced cables connected at adjacent ends to one of the rigid members, means connecting the cables one to another at spaced intervals along their lengths, looped means connected to the other adjacent ends of the cables, and spaced hooks secured to the other rigid member for detachably connecting the said looped means of the cables.

3. In a supporting sling, a pair of elongated rigid substantially V-shaped end members each having means for their attachment to a common connection, a plurality of laterally spaced rings secured permanently to one of the rigid members, a plurality of laterally spaced cables secured at adjacent ends to the rings, looped means connected to the other adjacent ends of the cables, and a plurality of laterally spaced hooks secured to the other rigid member, the said hooks being constructed and arranged to detachably engage with the looped members of the cables.

4. In a supporting sling a pair of substantially V-shaped rigid end members having spaced substantially parallel legs, a rigid member interposed between and secured to the legs of each of the end members, a plurality of laterally spaced rings secured permanently to one of the rigid members, a plurality of laterally spaced cables secured at adjacent ends to the rings, looped means connected to the other adjacent ends of the cables, a plurality of laterally spaced hooks secured to the other rigid member, the said hooks being constructed and arranged to engage with and become attached to the looped members of the cables, and a flat flexible member extending substantially the length of the cables at one side thereof, the said flexible member being constructed and arranged to extend between the cables and a load around which the sling is extended.

5. In a supporting sling, a pair of rigid end members, means carried by the end members for connecting them to a common connection, a plurality of laterally spaced cables connected at adjacent ends to one of the end members, means for alternately connecting the cables at spaced points along their lengths one to another, means for detachably connecting the other adjacent ends of the cables to the other rigid end member, and a substantially flat flexible member extending substantially the length of the cables at one side thereof, the said flexible member being constructed and arranged to extend between the cables and the load around which the sling is extended.

VIGGO J. KNUDSEN.

REFERENCES CITED

The following references are of record in the file of this patent:

UNITED STATES PATENTS

| Number | Name | Date |
| --- | --- | --- |
| 641,961 | Hill | Jan. 23, 1900 |
| 1,325,025 | Linnertz | Dec. 16, 1919 |
| 1,862,312 | Kositzky | June 7, 1932 |

FOREIGN PATENTS

| Number | Country | Date |
| --- | --- | --- |
| 547,176 | Great Britain | Aug. 17, 1942 |